A. LARSEN.
HORSESHOE PAD.
APPLICATION FILED OCT. 18, 1912.
1,111,843.
Patented Sept. 29, 1914.
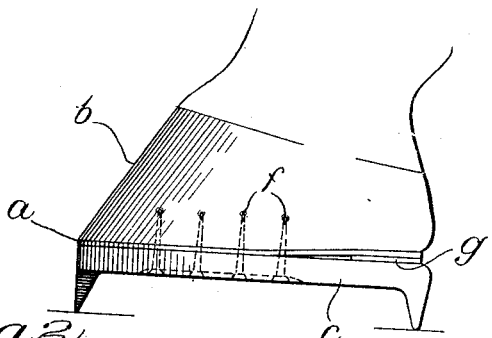
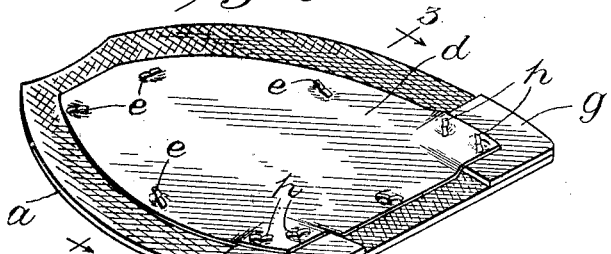
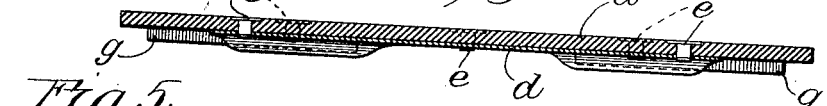
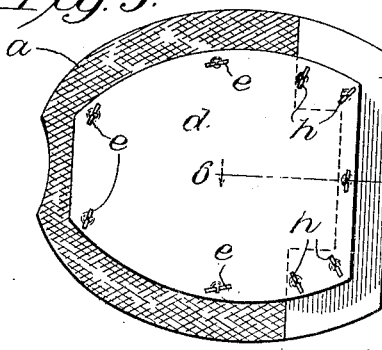
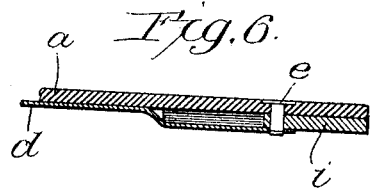
Witnesses:
Harry S. Gaither
Eugene C. Wann
Inventor:
Andru Larsen
by Poole & Brown
Attys

UNITED STATES PATENT OFFICE.

ANDRU LARSEN, OF CHICAGO, ILLINOIS.

HORSESHOE-PAD.

1,111,843.  Specification of Letters Patent.  Patented Sept. 29, 1914.

Application filed October 18, 1912.  Serial No. 726,428.

*To all whom it may concern:*

Be it known that I, ANDRU LARSEN, a citizen of the United States, and a resident of Chicago, in the county of Cook and State of Illinois, have invented certain new and useful Improvements in Horseshoe-Pads; and I do hereby declare that the following is a full, clear, and exact description thereof, reference being had to the accompanying drawings, and to the letters of reference marked thereon, which form a part of this specification.

This invention relates to that class of horse-shoe pads which are adapted to be interposed between the shoe and the hoof of an animal for the purpose of protecting the hoof.

The principal object of this invention is to provide a simple, economical and efficient horse-shoe pad or hoof pad.

A horse-shoe pad or hoof pad of the construction herein described and illustrated constitutes a very desirable form of pad, which in its preferred form comprises a flexible cushion member or main body portion of flexible material, and a shield member of relatively stiff and strong material, such as metal, secured thereto and adapted to enable the flexible member to extend beyond the marginal edges of the shield plate and between a hoof and shoe, and to provide a heel cushion formed of compressible material such as one or more pieces of leather attached to the metallic shield and extending between the flexible member and shield and adapted to be held in position to extend laterally beyond the opposite side margins or edges of the plate and between a hoof and shoe. A pad may thus be provided which—although economically constructed from pieces of ordinary sheet material such as sheets or pieces of webbing or canvas, sheet metal, and leather—is nevertheless of greater thickness at its rear end or heel portion than at its toe or forward end, and preferably of greater thickness at the points which are interposed between the rear end portions of the shoe and hoof than at the central portion between such points, whereby the hoof is shielded and protected from injury by coming in contact with nails or other injurious obstacles or substances, and an efficient supporting cushion is provided beneath the heel portion of the hoof as well as beneath the toe and side portions thereof adapted to minimize the shocks to which the hoof is subjected.

Other and further objects and advantages of the invention will appear from an examination of the description and claims and from an inspection of the accompanying drawings.

The invention consists in the features, combinations and details of construction herein described and claimed.

In the accompanying drawings, Figure 1 is a view in side elevation of a hoof and shoe provided with a pad constructed in accordance with my improvements, interposed therebetween; Fig. 2, a perspective view of a horse-shoe pad constructed in accordance with my improvements, showing the same in inverted position; Fig. 3, an enlarged view in transverse section taken on line 3—3 of Fig. 2, looking in the direction of the arrow; Fig. 4, a detail view in side elevation of a rear portion of the pad shown in Figs. 1 and 2; Fig. 5, a bottom plan view of a modified form of my improved horse-shoe pad, showing the compressible heel piece or cushion extending entirely across the shoe with its opposite ends in position to extend between the hoof and the rear end portions of the shoe, and with its central portion between the main flexible body member or pad proper and the bottom metallic shield portion of the pad; and Fig. 6, an enlarged sectional view in detail taken on line 6—6 of Fig. 5, looking in the direction of the arrow.

In constructing a horse-shoe pad or hoof pad in accordance with my invention and improvements, I provide a flexible member or main body portion $a$ which is of the general contour of the bottom of a horse's hoof or of a horse-shoe, or the end and side marginal edges of which are of the general contour of the corresponding edges of a horse-shoe or a hoof. The member $a$ is, by preference, formed of one integral piece adapted to extend between the hoof $b$ and the shoe $c$ along and beneath both side margins of the hoof and at the forward end or toe of the same. This flexible main body or cushion member may be formed of one or more layers of flexible material such as heavy canvas, webbing or other fibrous material held together by means of a suitable, preferably water-proof, adhesive substance such as rubber cement and forming a single piece of laminated material. A shield $d$ formed of relatively strong, stiff and durable material, such, for instance, as sheet metal, is provided and secured to the under side of the flexible member $a$, and its front and side margins are of the same or similar general contour as the bottom of the hoof or the inner margin of a horse-shoe. The shield is of smaller dimensions than the member $a$ both transversely and longitudinally, so that the marginal portions of the member $a$ project beyond the margins of the shield on both sides and preferably at both ends of the shield or plate. The shield plate is secured to the member $a$ by means of split rivets $e$, or other similar or desired connecting means, adapted to securely hold the shield or bottom protecting plate $d$ and the member $a$ together without interfering with or preventing the securing of the shoe to the hoof in an efficient manner and by suitable securing means such as nails $f$ driven through the shoe and pad and into the hoof.

From the foregoing it will be seen that the front end and side marginal portions of the member $a$, which project beyond the corresponding marginal edges of the plate or shield $d$, are, by preference, formed in one integral piece of flexible material, as already suggested, and that the central portions of the hoof and of the member $a$ are entirely shielded and protected by the shield $d$ on the bottom side of the said flexible member.

In order to render the pad of greater thickness and of proper strength at the rear end and particularly at points on opposite sides of the rear or heel portion of the hoof and shoe as compared with the forward or toe end of the pad, and in order to provide an efficient cushion for supporting the heel portion of the hoof and reducing to a minimum the injurious effects of shocks to which the hoof is exposed in traveling over hard roadways, rocks, etc., one or more heel pieces or heel cushion and filler members $g$ of compressible material are interposed between the rear portion of the flexible member $a$ and the shield $d$ and secured to said shield plate and to the flexible main body $a$ by means of split rivets $h$, or similar securing means, which rivets extend through said heel pieces or heel cushion members and through the plate $d$ and flexible member $a$, so as to firmly secure said parts together.

I prefer to make the heel cushion or cushion portions of the pad in two pieces, as indicated in Fig. 2. These cushion members $g$ are formed preferably of leather and are interposed between the shoe and hoof and between the flexible member $a$ and the plate $d$ at the opposite rear corners of the plate and pad, as already suggested. The portion of the pad which is located centrally or between the rear end portions of the shoe, or between said heel cushion portions, is thus of less thickness and more flexible than the corner portions, and is adapted to yield somewhat under pressure due to the weight of the animal, thus forming a yielding protecting pad adapted to provide ample space for the frog and the leather heel cushion members $g$ are securely held in place between the hoof and shoe by the metallic shield plate, and also by the flexible member $a$. The heel cushion, however, may be formed in one integral piece $i$ of flexible material such, for instance, as leather, as illustrated in Fig. 5, which piece extends entirely across the main body portion or flexible member $a$ from side to side of the shoe at the rear end of the pad and shoe, its opposite ends being thus adapted to extend or to be interposed between the rear or heel portion of the hoof and the rear end portions of the shoe. The member $i$ thus forms a transverse reinforcement for the pad, which in a measure, performs the function of a transverse bar for the pad and shoe when the pad and shoe are connected by means of the nails driven through the shoe and pad and into the hoof. The heel supporting and filler members $g$ and $i$ are thus adapted to form a simple and efficient cushion and heel support for the hoof of the animal to be shod, and to enable a simple and efficient hoof pad or horse-shoe pad to be made principally from sheets of material such as webbing or heavy canvas, sheet metal and leather of uniform thickness, and therefore very economically, and at the same time embodying in such a cheaply constructed pad the desired greater thickness at the rear portion than at the forward portion or toe portion thereof.

A further advantage of the construction above described is that by thus providing a pad of greater thickness at its rear end portion or heel than at the forward or toe end the hoof may be trimmed to the most desirable shape according to the requirements of the condition or natural shape of the hoof itself without the necessity of making the hoof conform more closely to the shape of the shoe than is consistent with the most desirable condition of the hoof itself, and the shoe may be formed in such a manner as to provide a shoe which is of proper construction and which may be slightly inclined downward and rearward on the upper side of its rear end portions as a natural result of constructing and forming it in the most economical manner and approved shape, which need not be determined by the shape of the hoof to the detriment of the shoe, and the cushion or heel member may be interposed between the hoof and shoe in such a manner as to enable the shoe and pad to perform their functions in the most efficient manner. In other words, the hoof is not required to be trimmed in an undesirable manner or to its injury in order to accommodate itself to the shoe, and the shoe may be shaped so as to have the greatest possible degree of efficiency, and the heel portion of the hoof will be properly cushioned and supported and the entire hoof trimmed to proper shape and protected by a pad having the advantage of greater thickness at the heel than at the toe so as to efficiently support and cushion the heel portion of the hoof.

I claim:

1. A horse-shoe pad, comprising a flexible body member having front and side marginal portions of the general contour of the corresponding outer edge portions of the horse-shoe, and adapted to extend between the hoof and the shoe, a metallic shield plate secured to the flexible body member, a heel cushion member formed of compressible material and having all portions thereof that serve to cushion the heel of the hoof located between the hoof and the shoe, said heel cushion member being in contact with the adjacent marginal parts of the flexible body member, and means for securing said heel cushion member to the flexible member.

2. A horse-shoe pad comprising a flexible main body member having all of its side and end marginal portions formed in one integral piece, the outer edge of said member being of the general contour of the outer edge of a horse-shoe, a metallic shield plate secured to the under side of said flexible main body member, a heel cushion member formed of leather and extending between the shield plate and said flexible main body member and projecting laterally beyond the rear portion of the shield plate, and means for securing the leather heel cushion member to the shield plate.

3. A horse-shoe pad comprising a flexible body member having all of its side and end marginal portions formed in one integral piece, the outer edge of said main body member being of the general contour of the outer edge of a horse-shoe, a shield plate secured to the under side of said flexible main body member, and compressible heel cushion members secured to the shield plate at the rear portion thereof and extending between the shield plate and said flexible body member and projecting laterally beyond the opposite side margins of said plate.

4. A horse-shoe pad comprising a flexible main body member having side and end marginal portions formed in one integral piece, the outer edge of said member being of the general contour of the outer edge of a horse-shoe, a metallic shield plate secured to the under side of said flexible main body member, said flexible main body member having marginal portions extending beyond the edges of said plate at the end margin and both side margins of the latter and adapted to extend between a hoof and shoe, heel cushion members formed of leather and extending laterally and endwise beyond the margins of the shield plate at the rear corners of the latter and adapted to extend between a hoof and shoe, and means for securing said heel cushion members to the opposite rear corners of the shield plate, respectively.

5. A horse-shoe pad comprising a flexible main body member having all of its side and end marginal portions formed in one integral piece, the outer edge of said member being of the general contour of the outer edge of a horse-shoe, a shield plate secured to said flexible main body member, said flexible main body member having marginal portions extending beyond the edges of said plate at the end margin and both side margins of the latter and adapted to extend between a hoof and shoe, compressible heel cushion members extending over the marginal parts of said flexible main body member exterior to the rear and side margins of the shield plate, and means connecting said cushion members with the shield plate and body member.

6. A horse-shoe pad comprising a flexible main body member having all of its side and end marginal portions formed in one integral piece, the outer edge of said member being of the general contour of the outer edge of a horse-shoe, a shield plate secured to said flexible main body member, said flexible main body member having marginal portions extending beyond the edges of said plate at the end margin and both side margins of the latter and adapted to extend between a hoof and shoe, heel cushion members extending over the marginal parts of said flexible main body member and exterior to the rear and side margins of the shield plate, and means for securing the heel cushion members to the shield plate.

7. A horse-shoe pad comprising a flexible main body member having all of its side and end marginal portions formed in one integral piece, the outer edge of said member being of the general contour of the outer edge of a horse-shoe, a shield plate secured to said flexible main body member, said flexible main body member having marginal portions extending beyond the edges of said plate at the end margin and both side margins of the latter and adapted to extend between a hoof and shoe, heel cushion members formed of flexible material and extending laterally and endwise beyond the opposite sides of the shield plate at the rear corners of the latter and adapted to extend between a hoof and shoe, means for securing said heel cushion members to the adjacent corners of the shield plate, and means for securing the flexible body member in operative position between a hoof and shoe.

In testimony, that I claim the foregoing as my invention I affix my signature in the presence of two witnesses, this 15th day of October A. D. 1912.

ANDRU LARSEN.

Witnesses:
CHARLES N. POOLE,
EUGENE C. WANN.